(12) United States Patent
Ishikawa

(10) Patent No.: US 6,316,072 B1
(45) Date of Patent: Nov. 13, 2001

(54) ROTARY BODY

(75) Inventor: Masaru Ishikawa, Saitama-ken (JP)

(73) Assignee: Pioneer Electronic Corporation, Tokyo (JP)

(*) Notice: Subject to any disclaimer, the term of this patent is extended or adjusted under 35 U.S.C. 154(b) by 0 days.

(21) Appl. No.: 09/175,533

(22) Filed: Oct. 20, 1998

(30) Foreign Application Priority Data

Oct. 23, 1997 (JP) .................................................. 9-309209

(51) Int. Cl.$^7$ .............................. G03H 1/22; G03H 1/26; G09F 19/12; G11B 33/10
(52) U.S. Cl. .................. 428/66.5; 428/64.1; 428/167; 428/542.2; 428/913
(58) Field of Search .................................. 428/66.5, 66.6, 428/167, 206, 207, 542.2, 64.1, 913, 343; 369/285, 286, 273; 430/270.11; 359/567, 572

(56) References Cited

U.S. PATENT DOCUMENTS 4,835,090 * 5/1989 Sawyer .................................. 430/367
5,731,054 * 3/1998 Chapman et al. .................. 428/64.1

* cited by examiner

Primary Examiner—Blaine Copenheaver
Assistant Examiner—Alicia Chevalier
(74) Attorney, Agent, or Firm—Arent Fox Kintner Plotkin & Kahn, PLLC

(57) ABSTRACT

A rotary body such as an optical disc has a picture pattern formed on a surface perpendicular to a rotating center axis of the disc, said picture being recognizable when irradiated by a light. In particular, an area corresponding to the picture pattern comprises a reflective type grating consisting of a plurality of grooves arranged in parallel with one another.

5 Claims, 5 Drawing Sheets

ROTARY BODY

BACKGROUND OF THE INVENTION

The present invention relates to a rotary body such as an optical disc, in particular relates to an optical disc having a picture pattern printed on one surface thereof.

An optical disc such as a CD (compact disc) usually has a label (a picture) printed on one of its surfaces to indicate the content of the information recorded on the disc. Such a label is visible and recognizable by naked-eyes when the CD is in a stopped condition, but is not visible and recognizable by naked-eyes when the CD is being played in a CD player unless using a special illumination device capable of performing a spot irradiation in synchronism with the rotation of the player.

In order to solve the above problem, U.S. Pat. No. 5,155,605 has disclosed an improvement for easily recognizing a label (picture) on a disc even when the disc is in a rotating condition. According to the U.S. patent, the surface of a disc is used as a holographic plate. Such holographic plate is exposed to an interference fringe light obtained by mutual interference between a light beam irradiating a picture (to be recorded on one surface of a disc) and a coherent reference light beam having a predetermined incidence angle, thereby forming a hologram having the above picture data recorded thereon. Then, simply by rotating the disc (which serves as a hologram having a picture recorded thereon), it is possible for a user to recognize the picture on the surface of the disc, without using any special optical means which is usually otherwise required to be positioned between the user and the disc.

In principle, a reflected light can lead to image-formation only when an irradiation light beam irradiating an object (such as the above picture) and a reference light beam are incident with the same incidence angle. If an irradiation light beam is fixed, then, an incidence angle of the irradiation light beam with respect to the hologram will change with the rotation of the disc. Thus, during each rotation of the disc, a reflected light can lead to image-formation only when the irradiation light beam is incident on to the hologram with a predetermined incidence angle (when the irradiation light beam and a reference light beam are incident on to the hologram with an exactly the same incidence angle). Namely, since during each rotation the image-formation can be effected once when the irradiation light beam is incident on to the hologram with a predetermined incidence angle, a completed image may be obtained in synchronizm with the rotation of the disc, allowing a user to recognize the picture on the disc surface by virtue of residual image effect.

In U.S. Pat. No. 5,155,605, the sun light is used as an irradiation light. Since the sun light is a widely diffused light containing various light components of different frequencies, it also contains a light component which can serve as the above reference light beam. Such reference light beam component is incident on to an object with a predetermined incidence angle.

However, with the method disclosed in U.S. Pat. No. 5,155,605, even when a disc is in a stopped condition, it is still difficult for a user to recognize an object (a picture on the disc) if an incidence angle of an irradiating light beam is not adjusted to a predetermined angle. In addition, if a new picture is to be formed on a disc, it will be necessary to form a new hologram and to adjust a position for the new picture to form on the disc. This, however, has been proved to be very troublesome.

SUMMARY OF THE INVENTION

It is an object of the present invention to provide an improved rotary body such as an optical disc enabling a user to easily recognize a label such as a picture pattern on the disc surface without a necessity of adjusting the disc (no matter the disc is rotating or stopped), so as to solve the above problem peculiar to the above prior art.

According to the present invention, there is provided a rotary body such as an optical disc having a picture pattern formed on a surface perpendicular to a rotating center axis of the disc, said picture being recognizable when irradiated by a light characterized in that an area corresponding to the picture pattern comprises a reflective type grating consisting of a plurality of grooves arranged in parallel with one another.

In detail, the disc comprises: a reflecting layer having formed thereon a reflective type grating consisting of a plurality of grooves arranged in parallel with one another; a light transmissible layer adapted for a light to pass therethrough, said light passing through areas corresponding to the picture pattern on said light transmissible layer.

According to the present invention, there is further provided a rotary body such as an optical disc having a picture pattern formed on a surface perpendicular to a rotating center axis of the disc, said picture being recognizable when irradiated by a light, said disc comprising: a reflecting layer having formed thereon a reflective type grating consisting of a plurality of grooves arranged in parallel with one another, with the reflecting layer having a print formed thereon corresponding to the picture pattern.

In one aspect of the present invention, the plurality of grooves are rectangular grooves, and the above picture pattern is symmetrical with respect to the rotating center of the rotary body.

In another aspect of the present invention, the plurality of grooves are blaze grooves.

The above objects and features of the present invention will become better understood from the following description with reference to the accompanying drawings.

DETAILED DESCRIPTION OF THE PREFERRED EMBODIMENTS

Figure 1:
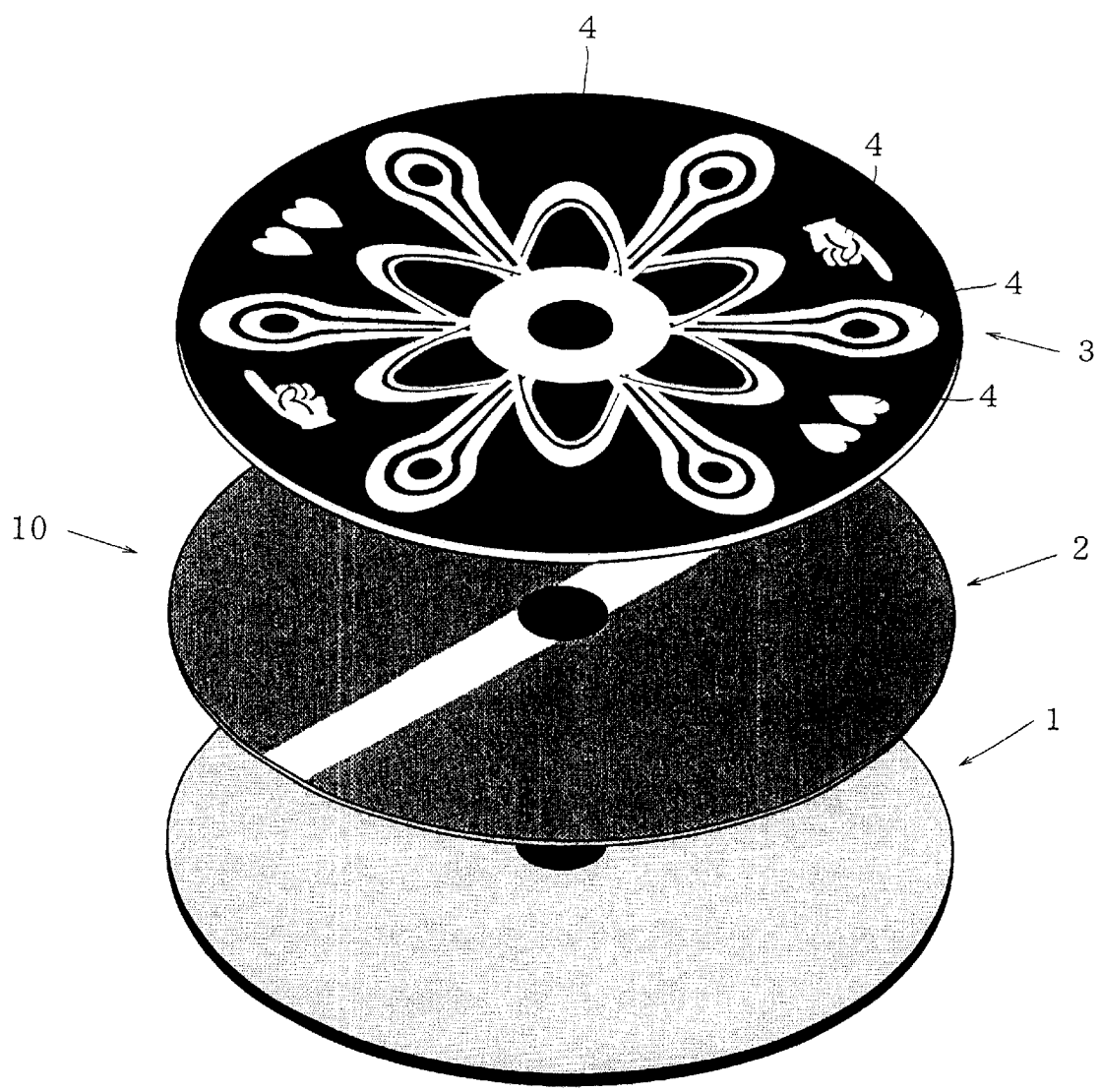
FIG. 1 is a schematic exploded view illustrating a rotary body made according to the present invention.

FIG. 1 illustrates a rotary body such as an optical disc made according to the present invention. As shown in FIG. 1, the optical disc 10 comprises a substrate layer (CD) 1, a reflecting layer 2 having a diffraction grating structure, a light-transmissible layer 3 having printed thereon a picture pattern. In fact, the reflecting layer 2 and the light-transmissible layer 3 are laminated on one side of the substrate layer 1 so as to receive an irradiation light for recognizing a picture pattern on the transmissible layer 3.

The reflecting layer 2 is formed by a metal such as aluminum and having a diameter which is substantially the same as that of the substrate layer 1. In particular, a diffraction grating structure is formed on the aluminum surface of the reflecting layer 2.

Figure 2:
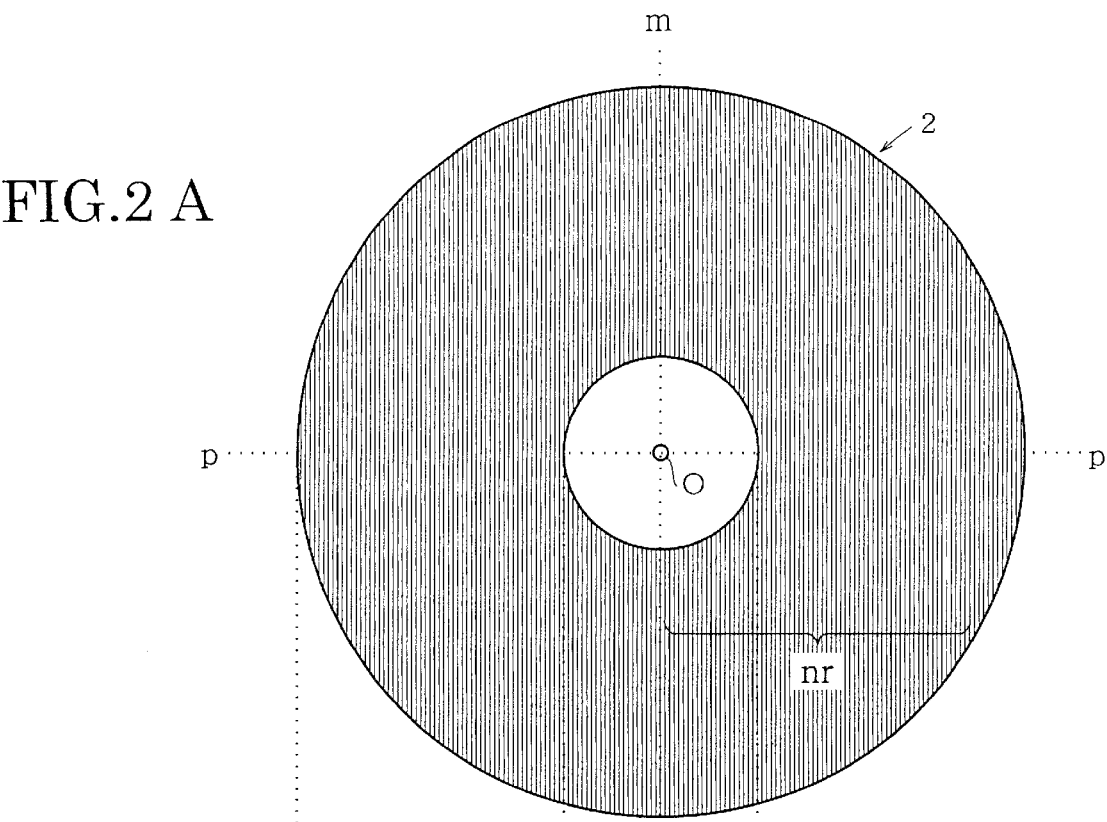
FIGS. 2A–2C are schematic explanatory views indicating a reflecting layer of the rotary body made according to one embodiment of the present invention.
Figure 2:
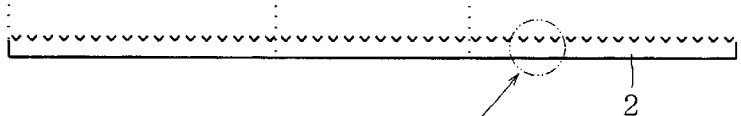
Figure 2:
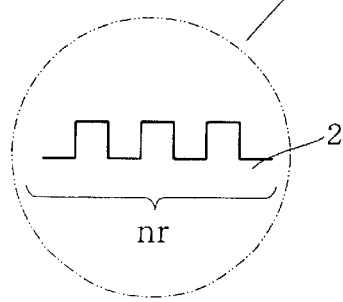

Referring to FIG. 2, a plurality of rectangular grooves nr are formed over the entire surface of the reflecting layer 2, in a manner such that they are all parallel with a center line m—m passing through a rotating center 0. In more detail, FIG. 2A is a plane view indicating one surface of the reflecting layer 2 which will be irradiated by an irradiation light. FIG. 2B is a cross sectional view taken along a line p—p in FIG. 2A. FIG. 2C is an enlarged view indicating in detail the structure of the rectangular grooves.

Figure 3:
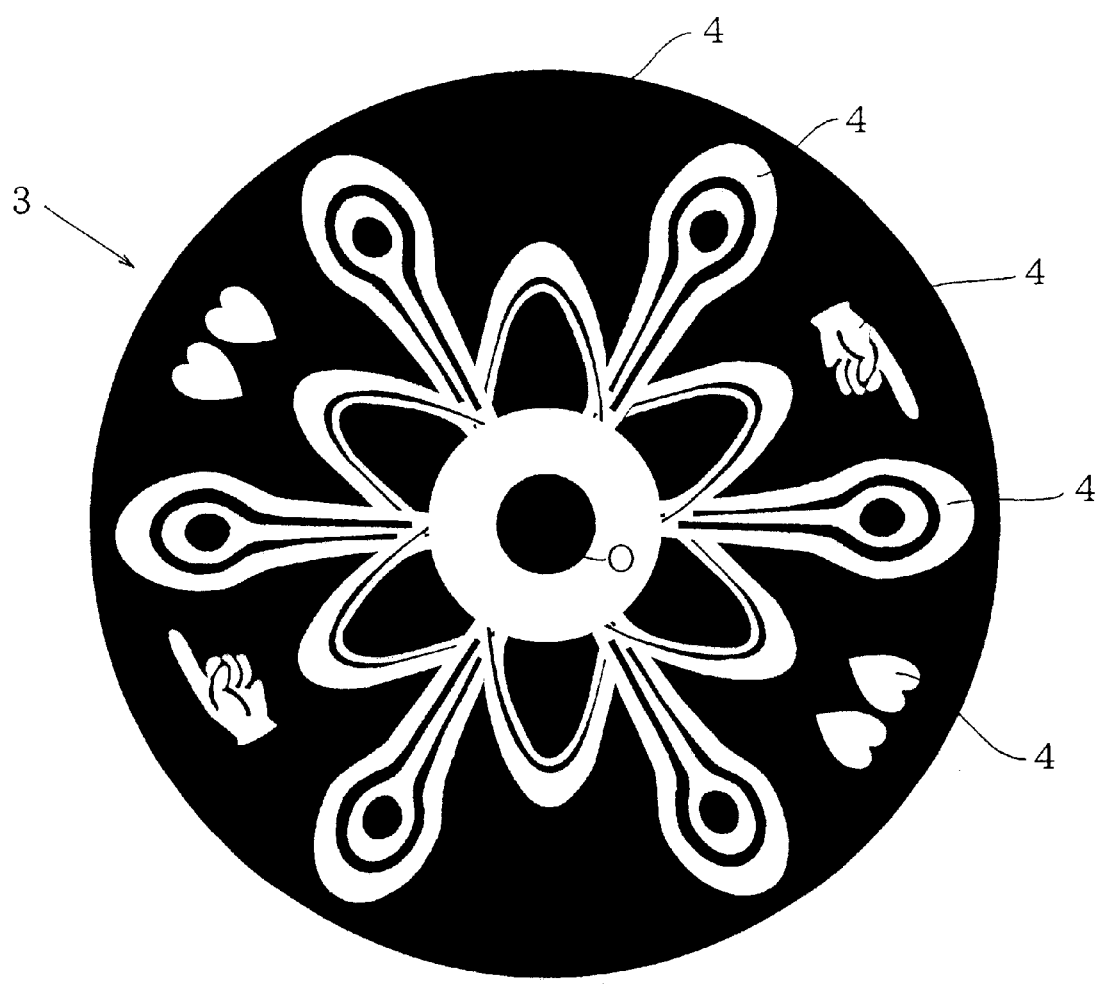
FIG. 3 is a plane view illustrating a transmissible layer of the rotary body made according to the present invention.

The light-transmissible layer 3 is formed by a transparent film having a diameter which is substantially the same as that of the substrate layer 1, and has printed thereon a predetermined picture pattern. With the formation of thus printed picture pattern, there will be two different kinds of areas when an irradiation light is irradiating onto the sheet 3. Namely, a part of the irradiation light will pass through one kind of areas (on the sheet 3) corresponding to a designed picture pattern, and a plurality of diffracted lights are thus caused by the reflecting layer 2, thereby forming some diffracted light areas. On the other hand, other part of the irradiation light will be stopped by blank areas on the sheet 3, so that no diffracted lights will be caused by the reflecting layer 2, thereby resulting in some areas having no diffracted lights. FIG. 3 is an explanatory view illustrating one designed pattern formed on the light-transmissible layer 3. In FIG. 3, white portions form a predetermined picture pattern designated by reference numerals 4.

In the present embodiment, the picture pattern illustrated in FIG. 3 is formed symmetrically with respect to the rotating center 0 of the disc 10.

Figure 4:
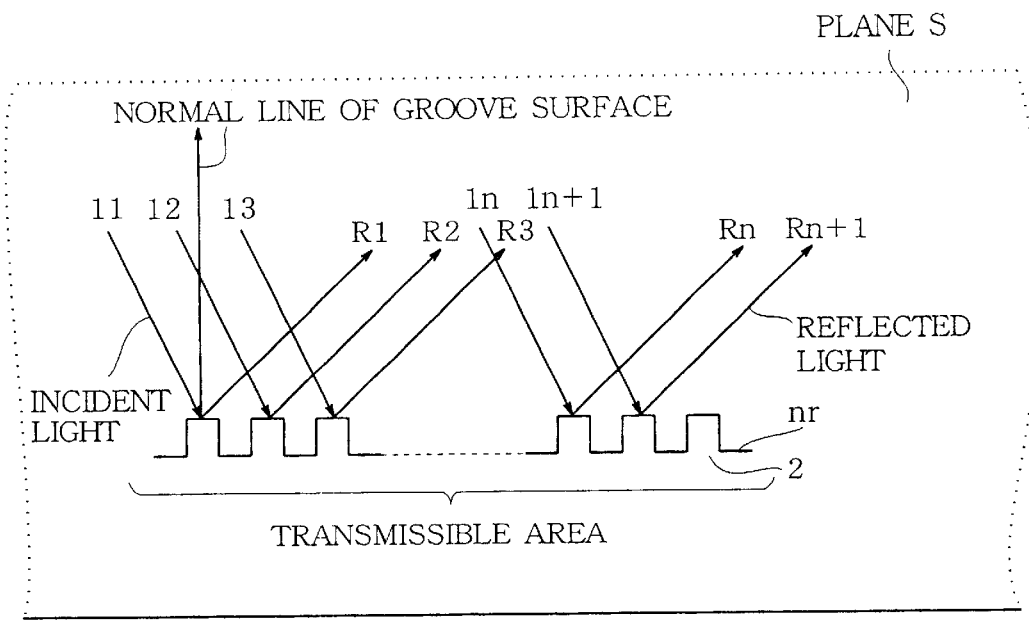
FIG. 4 is an explanatory view indicating a relationship between incident lights and diffracted lights, when using a reflective type diffraction grating made according to one embodiment of the present invention.
Figure 5:
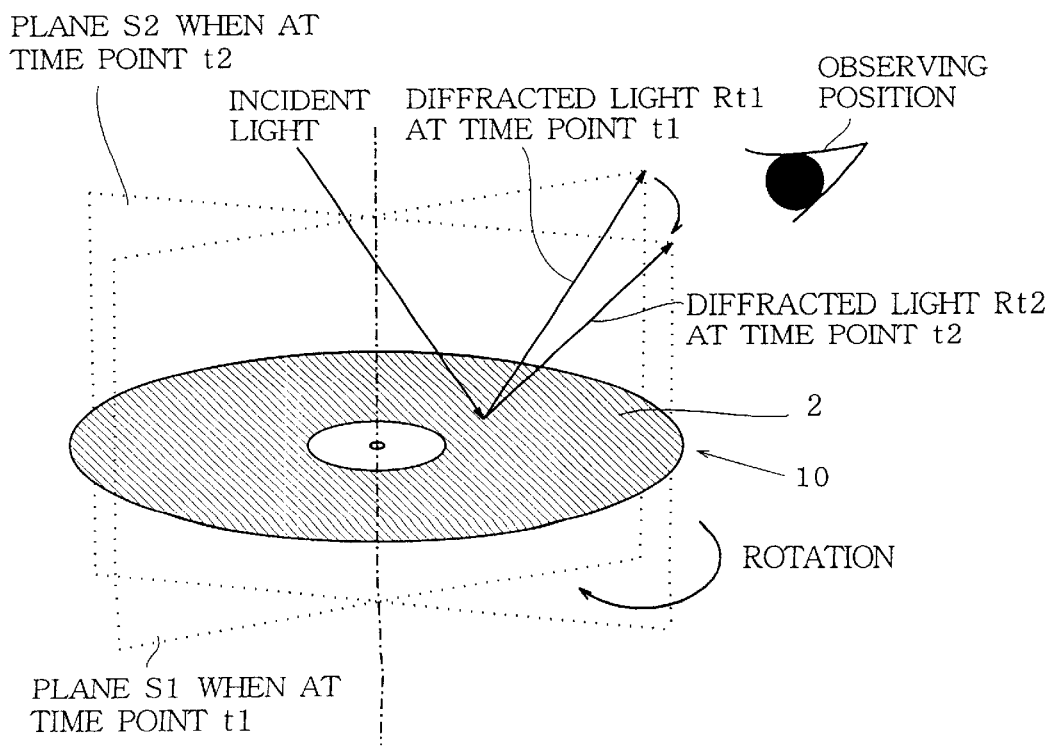
FIG. 5, is an explanatory view indicating a relationship between incident lights and diffracted lights at a time when the reflective type diffraction grating of FIG. 4 is rotating.

FIGS. 4 and 5 are explanatory views illustrating how a picture can be seen when the disc 10 of the present embodiment is being rotated. In this embodiment, it is preferred to utilize a diffused light involving a large frequency range, such as a white light from a fluorescent lamp, or a natural light such as the sun light. Further, a user is supposed to observe the disc 10 from a fixed position with respect to the rotating center 0 of the disc 10.

The condition of diffracted lights in the present invention will be described in detail with reference to FIG. 4.

Referring to FIG. 4, the reflecting layer 2 has on one surface thereof a plurality of rectangular grooves parallel to one another in a manner such that a diffraction grating structure is formed over the entire surface. In this way, light passing through the areas 4 of the light-transmissible sheet 3, will be diffracted by the diffraction grating structure. Therefore, in a plane S (FIG. 4) with the center line m—m (FIG. 2) serving as its normal line, a plurality of incident lights In having a predetermined incidence angle with respect to the diffraction grating, will cause a plurality of diffracted lights Rn reflecting with a diffraction angle determined by pitches of the diffraction grating. Therefore, if an observation is carried out in a direction in which the diffracted lights Rn are happening, it is possible to observe these diffracted lights Rn.

In particular, when the disc 10 is turned for 180 degrees, the incident lights irradiating with a predetermined incidence angle will produce diffracted lights reflecting with the above-described diffracted angle. Namely, the diffracted lights and the incident lights are mutually symmetrical with respect to the normal lines of the groove surfaces, i.e., each diffracted light is caused to reflect with a diffraction angle that is symmetrical with an incidence angle of an incidence light. In this way, if an irradiation (incident) light and an observation position are all fixed, a turning of every 180 degrees will allow diffraction lights to be seen once, so that one turning of 360 degrees will allow diffraction lights to be seen twice.

FIG. 5 is an explanatory view illustrating the conditions of diffracted lights while the disc 10 is rotating.

It is supposed that the disc 10 is driven by a spin motor of a CD player (not shown). At a time point t1 in a plane S1, while an irradiation light (diffused lights) is irradiating the disc 10, a light component having a predetermined incidence angle will produce a diffracted light Rt1 reflected with a predetermined diffraction angle. When the disc 10 continues to turn, the orientation (parallel to the center line m—m in FIG. 2) of diffraction grating will be changed, so that at a time point t2, the above light component will not exist at all on the plane S1. In this way, the diffracted light Rt1 produced at the time point t1 will disappear as soon as the disc 10 is rotated again. On the other hand, since in each rotating position of the disc 10 there is a light component irradiating on the disc 10 with a predetermined incidence angle, at a time point t2 in a plane S2 there will occur a diffracted light Rt2 caused by the light component (serving as an incidence light) having a predetermined incidence angle. Namely, as indicated in FIG. 5, a position for a reflected/diffracted light to happen will change in synchronize with the rotation of the disc 10. Therefore, if there is an observation point (at the time point t2) contained in the plane S2, it is possible to observe the diffracted light Rt2 so as to recognize a corresponding picture pattern on the disc 10.

In this way, when the disc 10 is turned by 180 degrees, it is possible for a user to recognize a picture pattern once. At this moment, if a picture pattern is symmetrical with respect to the rotating center 0 as shown in FIG. 3, a picture pattern may be easily recognized as a usually visible picture. Accordingly, due to an effect of residual image of a user's eyes, it is possible for the user to recognize the picture as if it is a still picture. Further, since one rotation (360 degrees) of the disc 10 allows a user to observe a picture pattern twice, it is possible to effectively reduce a flikering phenomenon which is otherwise unavoidable with a conventional method where a spot irradiation is performed during each rotation of an optical disc. In addition, with the use of present invention, it is allowed to dispense with any optical means to be positioned between the disc 10 and an observer (user).

Figure 6:
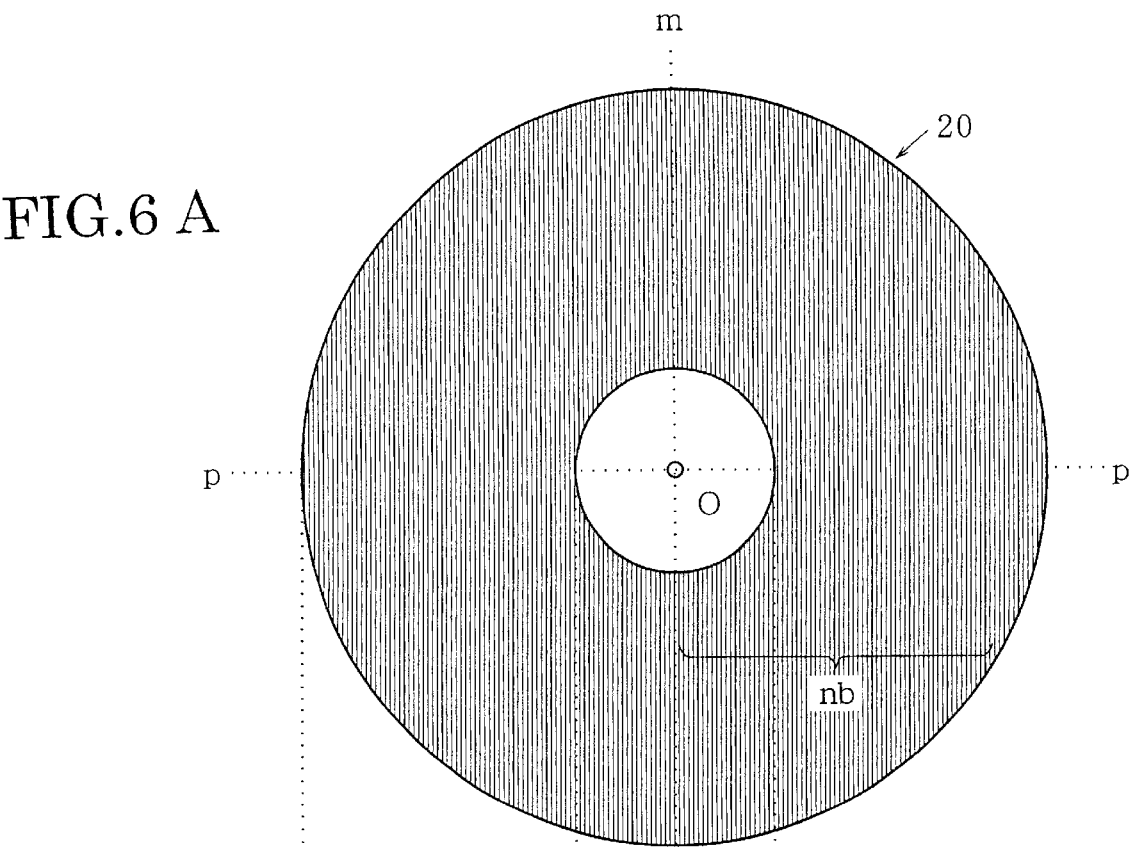
FIGS. 6A–6C are schematic explanatory views indicating a reflecting layer of a rotary body made according to another embodiment of the present invention.
Figure 6:
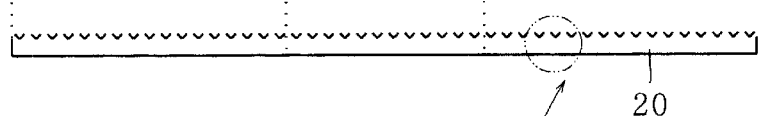
Figure 6:
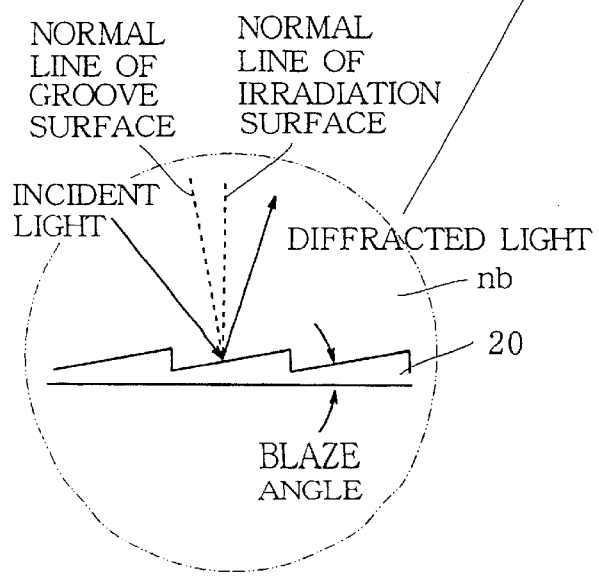

FIGS. 6A–6C are explanatory views illustrating another embodiment of the present invention. As shown in FIG. 6C, it is allowed to use a reflecting layer 20 having a plurality of blaze grooves formed on one surface thereof. Referring again to FIG. 6C, the blaze grooves nb are formed in a manner such that a normal line of each groove surface forms a predetermined angle (a blaze angle) with a normal line of a irradiation surface of the diffraction grating, thereby forming a saw-tooth structure. By adjusting the blaze angle, it is possible to improve the diffraction efficiency of primary diffracted lights. Namely, with the use of a reflective type grating formed with a plurality of blaze grooves nb, if an inclined shape of each blaze groove is designed properly, it is possible that only primary diffracted lights (caused by irradiation lights) are reflected with a predetermined diffracting angle.

In this embodiment, since a cross section shape of each blaze groove nb is not symmetrical with respect to the normal line of irradiation surface of the reflecting layer 20, one rotation of the disc allows a user to observe the diffracted lights only once. Namely, when a disc 10 is rotated by 180 degrees, since inclining directions of the saw-tooth grooves are different from one another with respect to the irradiation light, an incidence angle of the irradiation light will be different from that before the rotation of 180 degrees, so that the diffraction lights will also have diffraction angles different from those before the rotation of 180 degrees. In this way, if an irradiation (incident) light and an observation position are all fixed, a turning of 360 degrees will allow diffraction lights to be seen only once, thus a timing capable of observing diffracted lights during each rotation of 360 degrees, may be limited to only once. Thus, with a picture pattern depicted on the transmissible sheet 3, it is not necessary for the picture to have a symmetry with respect to the rotating center 0, therefore it is allowed to depict any type of a desired picture on the entire surface of a disc.

Further, it is also possible that a reflective type grating may be made so that saw-tooth grooves have intervals which are large enough with respect to a wavelength of an irradiation light, e.g., from several ten times to several hundred times the wavelength of an irradiation light. In such case, reflecting surfaces of the saw-tooth grooves serve as mirrors, so that it is possible to obtain directly reflected lights in a predetermined direction determined by the inclining angles of the saw-tooth grooves. Since such kind of directly reflected lights are not dependent upon a wavelength of an irradiation light, it is allowed to form a picture pattern by means of color print on the transmissible sheet 3 as shown in FIG. 3. Namely, since directly reflected lights have reflecting efficiencies not depending on a wavelength of an irradiation light, if a white color light is used as an irradiation light, a color-printed transmissible layer will act as a color filter for incident lights having predetermined incidence angles determined by inclining angles of the saw-tooth grooves. Therefore, lights having wavelengths corresponding to various colors are allowed to transmit therethrough or reflected therefrom, rendering it possible to reproduce a picture pattern just like a color print.

While the presently preferred embodiments of the this invention have been shown and described above, it is to be understood that these disclosures are for the purpose of illustration and that various changes and modifications may be made without departing from the scope of the invention as set forth in the appended claims.

What is claimed is:

1. A rotary disc comprising:

a reflecting layer having formed thereon a reflective grating including a plurality of parallel grooves; and at least one picture pattern formed on the reflecting layer on a surface perpendicular to a center axis of the rotary disc, the picture pattern being recognizable when irradiated by a light, wherein the plurality of parallel grooves are perpendicular to and/or face towards the surface on which the at least one picture pattern is formed.

2. A rotary disc comprising:

a reflecting layer having formed thereon a reflective grating including a plurality of parallel grooves;

a light transmittable layer that is laminated on the reflecting layer and permits light to be transmittable therethrough; and at least one picture pattern formed on the light transmittable layer on a surface perpendicular to a center axis of the rotary disc, the picture pattern being recognizable when irradiated by a light, wherein the plurality of parallel grooves are perpendicular to and/or face towards the surface on which the at least one picture pattern is formed.

3. The rotary disc according to either one of claims 1 and 2, wherein the reflecting layer is placed on a substrate layer.

4. The rotary disc according to either one of claims 1 and 2, wherein the plurality of grooves are rectangular grooves, and the above picture pattern is symmetrical with respect to the rotating center of the rotary disc.

5. The rotary disc according to either one of claims 1 and 2, wherein the plurality of grooves are blaze grooves.

* * * * *